United States Patent
Bronstein

(10) Patent No.: US 11,792,187 B2
(45) Date of Patent: *Oct. 17, 2023

(54) MULTI-PERSON AUTHENTICATION

(71) Applicant: Bank of America Corporation, Charlotte, NC (US)

(72) Inventor: Derryn Robert Bronstein, Park Ridge, NJ (US)

(73) Assignee: Bank of America Corporation, Charlotte, NC (US)

(*) Notice: Subject to any disclaimer, the term of this patent is extended or adjusted under 35 U.S.C. 154(b) by 128 days.

This patent is subject to a terminal disclaimer.

(21) Appl. No.: 16/985,791

(22) Filed: Aug. 5, 2020

(65) Prior Publication Data
US 2022/0046009 A1    Feb. 10, 2022

(51) Int. Cl.
*H04L 9/40*    (2022.01)

(52) U.S. Cl.
CPC .................. *H04L 63/0861* (2013.01)

(58) Field of Classification Search
CPC ... H04L 63/105; H04L 63/0861; H04L 63/08; G06V 40/16
USPC .......................................................... 726/6
See application file for complete search history.

(56) References Cited

U.S. PATENT DOCUMENTS

| | | |
|---|---|---|
| 6,697,947 B1 | 2/2004 | Matyas, Jr. et al. |
| 7,130,452 B2 | 10/2006 | Bolle et al. |
| 7,409,556 B2 | 8/2008 | Wu et al. |
| 8,275,175 B2 | 9/2012 | Baltatu et al. |
| 8,392,975 B1 | 3/2013 | Raghunath |
| 8,457,367 B1 | 6/2013 | Sipe et al. |
| 8,542,879 B1 | 9/2013 | Nechyba et al. |
| 8,558,663 B2 | 10/2013 | Newman et al. |
| 8,798,336 B2 | 8/2014 | Nechyba et al. |
| 8,918,851 B1 | 12/2014 | Iannamico |
| 9,047,538 B2 | 6/2015 | Nechyba et al. |
| 9,098,678 B2 | 8/2015 | Hao et al. |
| 9,117,109 B2 | 8/2015 | Nechyba et al. |
| 9,177,130 B2 | 11/2015 | Nechyba et al. |
| 9,189,788 B1 | 11/2015 | Robinson et al. |
| 9,256,794 B2 | 2/2016 | Braithwaite et al. |
| 9,530,132 B2 | 12/2016 | Cox |
| 9,953,149 B2 | 4/2018 | Tussy |
| 10,042,993 B2 | 8/2018 | Beigi |
| 10,049,287 B2 | 8/2018 | Holz et al. |
| 10,198,645 B2 | 2/2019 | Graumann et al. |
| 10,235,508 B2 | 3/2019 | Kursun et al. |

(Continued)

OTHER PUBLICATIONS

Netiq, Advanced Authentication 6.2, 2019 (Year: 2019).*
U.S. Appl. No. 16/985,833, filed Aug. 5, 2020, Bronstein.
U.S. Appl. No. 16/985,886, filed Aug. 5, 2020, Bronstein.

*Primary Examiner* — Tarek Elchanti

(57) ABSTRACT

A system includes a multi-person authentication server which receives an authentication request corresponding to a request to provide a first user access to a secure server. In response to the authentication request, a challenge-response message is provided to the first user device. A push notification is also provided to a second user device. A response to the challenge-response message is received from the first user device. If the received response indicates the first user is authenticated, the first user is allowed to access the secure server. If the received response indicates the first user is not authenticated, the first user is prevented from accessing the secure server.

20 Claims, 10 Drawing Sheets

(56) References Cited

U.S. PATENT DOCUMENTS

| | | | |
|---|---|---|---|
| 10,262,126 | B2 | 4/2019 | Tussy |
| 10,469,487 | B1 | 11/2019 | Griffin et al. |
| 10,572,874 | B1 | 2/2020 | Shahidzadeh et al. |
| 11,097,187 | B1* | 8/2021 | Tomlinson .............. A63F 13/70 |
| 2006/0158307 | A1 | 7/2006 | Lee et al. |
| 2008/0040278 | A1 | 2/2008 | DeWitt |
| 2010/0023400 | A1 | 1/2010 | DeWitt |
| 2010/0329568 | A1 | 12/2010 | Gamliel et al. |
| 2014/0016836 | A1 | 1/2014 | Gamliel |
| 2014/0289833 | A1 | 9/2014 | Briceno et al. |
| 2014/0289834 | A1 | 9/2014 | Lindemann |
| 2015/0140964 | A1* | 5/2015 | Horton ................. H04L 63/107 455/410 |
| 2017/0031639 | A1 | 2/2017 | Cudak et al. |
| 2017/0068961 | A1 | 3/2017 | Cox |
| 2017/0076078 | A1 | 3/2017 | Kim |
| 2017/0243225 | A1 | 8/2017 | Kohli |
| 2018/0039990 | A1 | 2/2018 | Lindemann |
| 2018/0308100 | A1 | 10/2018 | Haukioja et al. |
| 2019/0253404 | A1 | 8/2019 | Briceno et al. |
| 2019/0303551 | A1 | 10/2019 | Tussy |
| 2020/0314104 | A1* | 10/2020 | Achyuth ............. G06F 21/6218 |

* cited by examiner

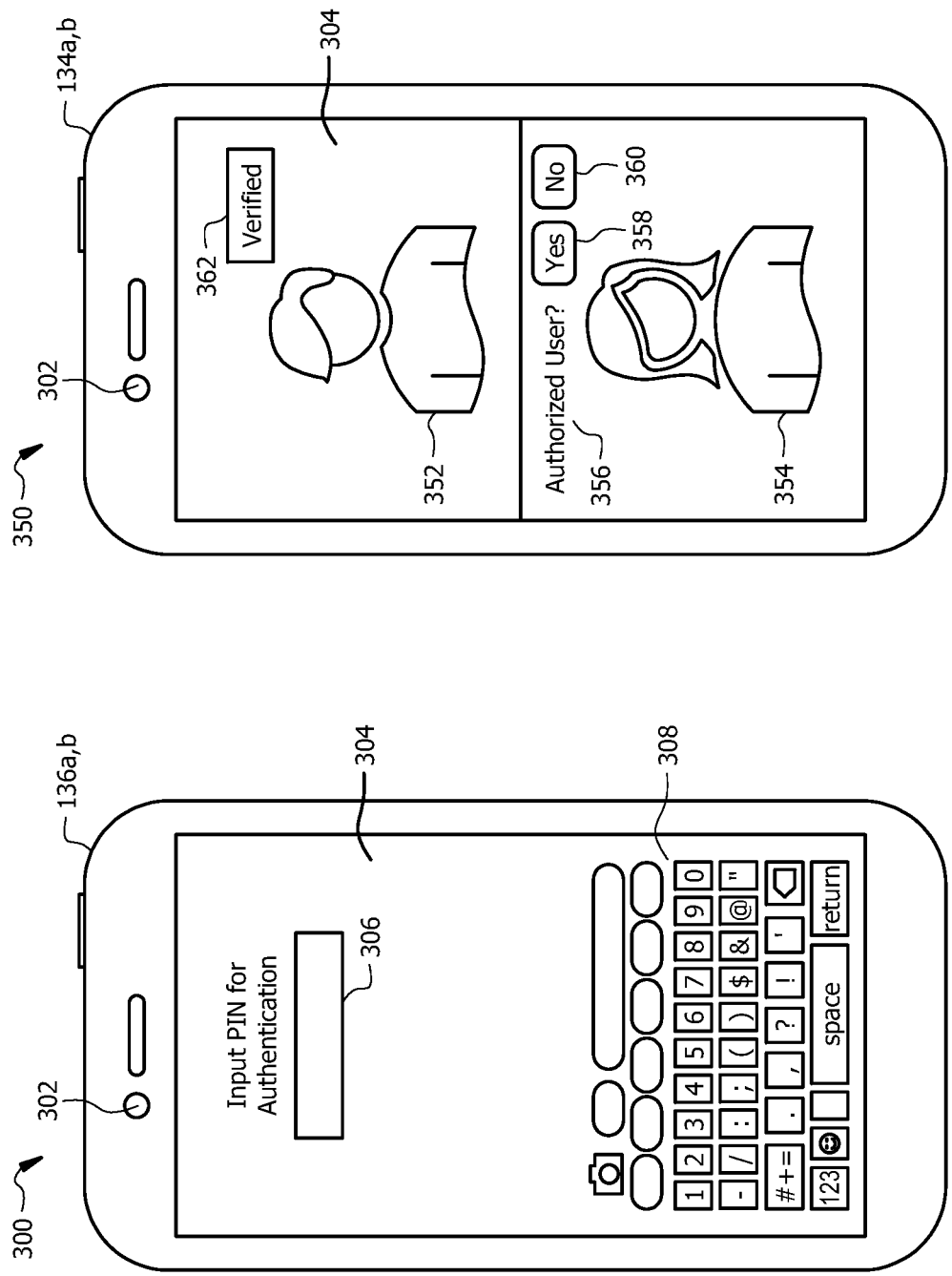

MULTI-PERSON AUTHENTICATION

TECHNICAL FIELD

The present disclosure relates generally to user authentication technology. More particularly, in certain embodiments, the present disclosure is related to multi-person authentication.

BACKGROUND

User authentication may be requested before a user is granted access to secure information and/or services. The purpose of user authentication is to determine that the user is an authorized individual who should be granted access to the secure information and/or services. For example, a user may be requested to provide a username and password to access a secure service, such as a service used to review and update personal information.

SUMMARY

In an embodiment, a system includes a multi-person authentication server which receives an authentication request corresponding to a request to provide a first user access to a secure server. In response to the authentication request, a challenge-response message is provided to the first user device. The challenge-response message indicates authentication of the first user of the first user device is needed and directs the first user device to capture a first image of a face of the first user. A push notification is also provided to a second user device. The push notification indicates confirmation of the authentication of the first user of the first user device is needed and directs the second user device to capture a second image of a face of the second user and provide an authentication result to the first user device. A response to the challenge-response message is received from the first user device. The response indicates the first user is authorized to access the secure server if the first image is an image of an authorized user of the secure server and the second image is an image of an administrator of the secure server. The response indicates the first user is not authorized to access the secure server if one or both of the following are true: (1) the first image is not the image of the authorized user of the secure server and (2) the second image is not the image of the administrator of the secure server. If the received response indicates the first user is authenticated, the first user is allowed to access the secure server. If the received response indicates the first user is not authenticated, the first user is prevented from accessing the secure server.

In another embodiment, a system includes a secure server and a first user device. The first user device includes a camera operable to capture a first image of a first user of the user device. The first user device receives a challenge-response message following a request for access to the secure server by the first user. Following receipt of the challenge-response message, the first user of the first user device is prompted to operate the camera to capture the first image of the first user. The first image includes an image of at least a portion of a face of the first user. A second image of a second user is received that includes an image of at least a portion of a face of the second user. Facial recognition is used to determine that the face of the first user included in the first image corresponds to a face of an authorized user of the secure server. Facial recognition is used to determine that the face of the second user included in the second image corresponds to a face of an authorized administrator of the secure server. The first user device generates a response to the challenge-response message. If both the face of the first user corresponds to the face of the authorized user of the secure server and the face of the second user corresponds to the face of the authorized administrator of the secure server, the response indicates the first user is authorized to access the secure server. If one or both of the face of the first user does not correspond to the face of the authorized user of the secure server and the face of the second user does not correspond to the face of the authorized administrator of the secure server, the response indicates the first user is not authorized to access the secure server.

In yet another embodiment, a system includes a secure server configured to host one or more secure applications and a first user device. The first user device includes a camera operable to capture a first image of a first user of the first user device. The first user device receives a notification that indicates confirmation of authentication of a second user of a second user device is needed after the second user requests access to the secure server. Following receipt of the notification, the first user device captures a first image of the first user. The first image includes at least a portion of a face of the first user. The first image is provided for presentation on the second user device.

Previous technology used for user authentication suffers from several disadvantages. For example, this disclosure recognizes that authentication techniques which rely on input from a single user (e.g., input of security credentials such as a password, PIN number, or the like) may be susceptible to compromise by a bad actor. For example, a bad actor may obtain a user's security credentials and use these credentials to gain access to secure information. Also, previous technology based on an authentication from a single user may be compromised if a bad actor obtains the user's device.

Certain embodiments of this disclosure provide unique solutions to the technical problems of previous authentication technology, including those problems identified above by facilitating a new multi-person authentication approach which involves the authentication of at least two authorized individuals before access is provided to secure information and/or services. For example, the disclosed systems provide several technical advantages, which include: 1) improved authentication security via a multi-person authentication process involving image-based authentication of two individuals; 2) the user-friendly, efficient, and secure request of authentication using a specially designed authentication-request application; and 3) the user-friendly, efficient, and secure confirmation of requested authentication via a specially configured authentication-confirmation application. As such, this disclosure may improve the function of computer systems used to provide user authentication prior to providing access to secured information and/or services by facilitating a unique multi-person authentication approach.

In some embodiments, improvements provided by this disclosure are incorporated into the practical application of a multi-person authentication server. The multi-person authentication server may receive a request from a user to access a secure server and, in response, provide a challenge-response message to the requesting user and a push notification instructing an appropriate confirming user (e.g., an administrator of the secure server) to take part in the authentication process. Once a confirmation response is received that is based on input from both users (e.g., verification of security credentials and user identities based on facial recognition), the server may allow the requesting user to access the secure information. The multi-person authentication server facilitates the efficient routing of requests to multiple user devices for secure and efficient authentication of user access based on the multi-person authentication approach described in this disclosure.

In some embodiments, improvements provided by this disclosure are incorporated into the practical application of a requesting user device which executes an authentication-request application. The authentication-request application is executed on a user device, such as a smartphone, and allows the requesting user to request and gain access to secure data using multi-person authentication. The authentication-request application receives a notification that authentication to access secure data is requested. A user of the requesting device may enter appropriate security credentials and may subsequently be presented with a user interface that facilitates efficient and secure multi-person authentication based on facial recognition. The device captures and presents an image of the user in one portion of the device's display and receives and presents an image of a confirming user in another portion of the display. Facial recognition may be used to determine if both users are authenticated before the user is allowed to access the requested information and/or services. In some embodiments, the facial recognition tasks for verifying identities of multiple users are performed entirely by the user device to ensure the authentication process for all users cannot be compromised by a single point of failure (e.g., if an associated authentication server were to be compromised).

In some embodiments, improvements provided by this disclosure are incorporated into the practical application of a confirming user device which executes an authentication-confirmation application. The authentication-confirmation application is executed on a user device, such as a smartphone, and allows a confirming user (e.g., an administrator of a server storing information and/or hosting applications with restricted user access rules) to provide confirmation of a request to access secure information and/or services. The authentication-confirmation application receives a notification that confirmation is requested for accessing secure information and/or services. A user of the confirming device may enter security credentials and present his/her face for imaging by a camera of the device. The device captures the image of the user, performs facial recognition-based authentication, and provides the authentication result to an appropriate device (e.g., the requesting user device described above). In some embodiments, the image of the user is provided to the requesting user device, and facial recognition-based authentication of the confirming user is performed at the requesting user device. In some embodiments, an image of the user requesting access to the secure information and/or services may be presented on a display of the device (e.g., similarly to as described above with respect to the authentication-request application). In some embodiments, the user may further provide confirmation via an input indicating whether the image includes the face of an individual known to have access to the secure information and/or services.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A and 3B are diagrams illustrating examples of information presented on a display of an example confirming user device of FIG. 1;

DETAILED DESCRIPTION

Figure 1:
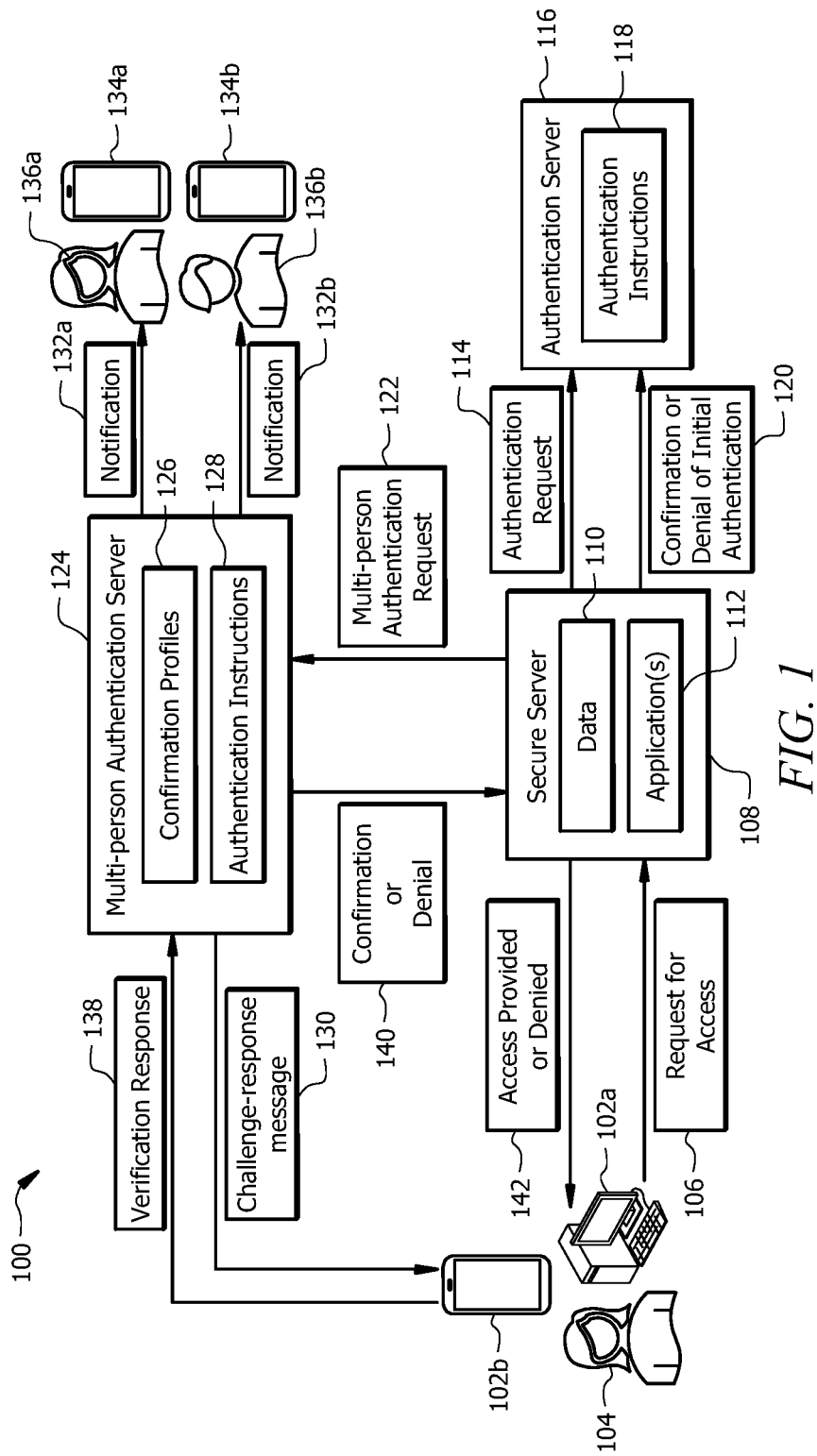
FIG. 1 is a schematic diagram of an example system for multi-person authentication.
Figure 2C:
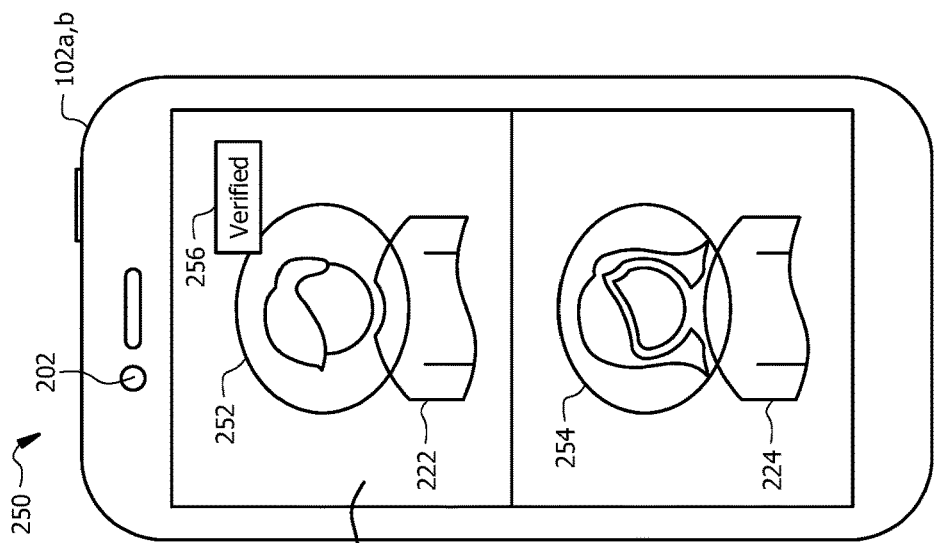
FIGS. 2A, 2B, and 2C are diagrams illustrating examples of information presented on a display of an example requesting user device of FIG. 1.
Figure 2B:
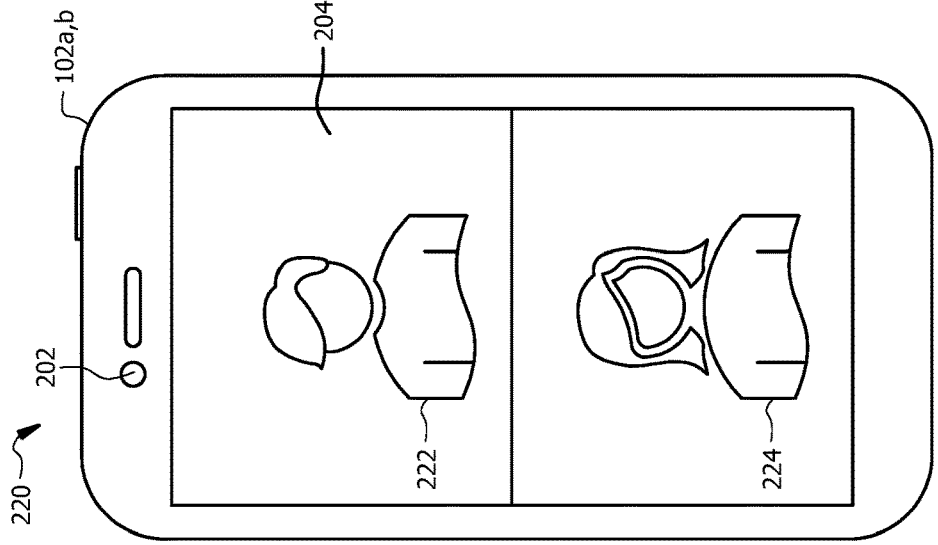
Figure 2A:
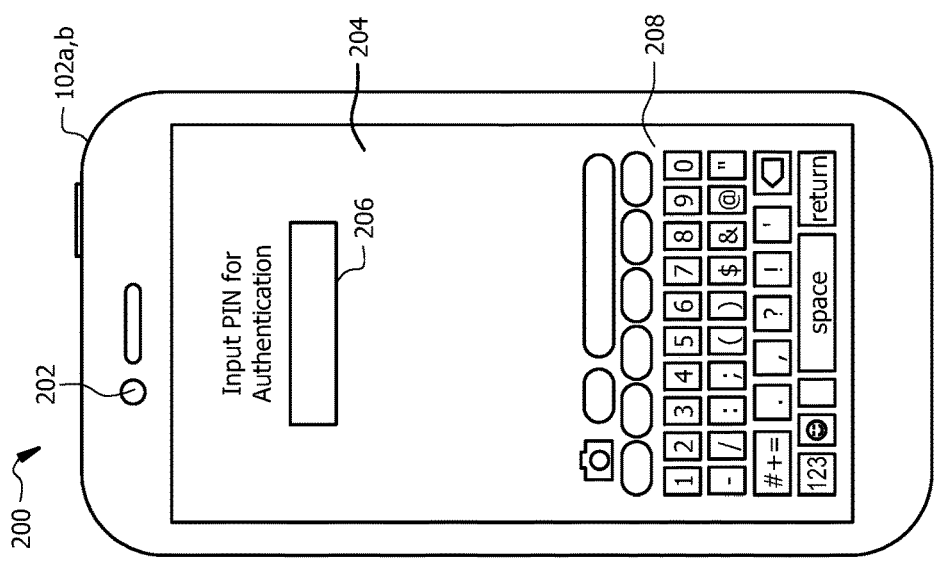
Figure 4:
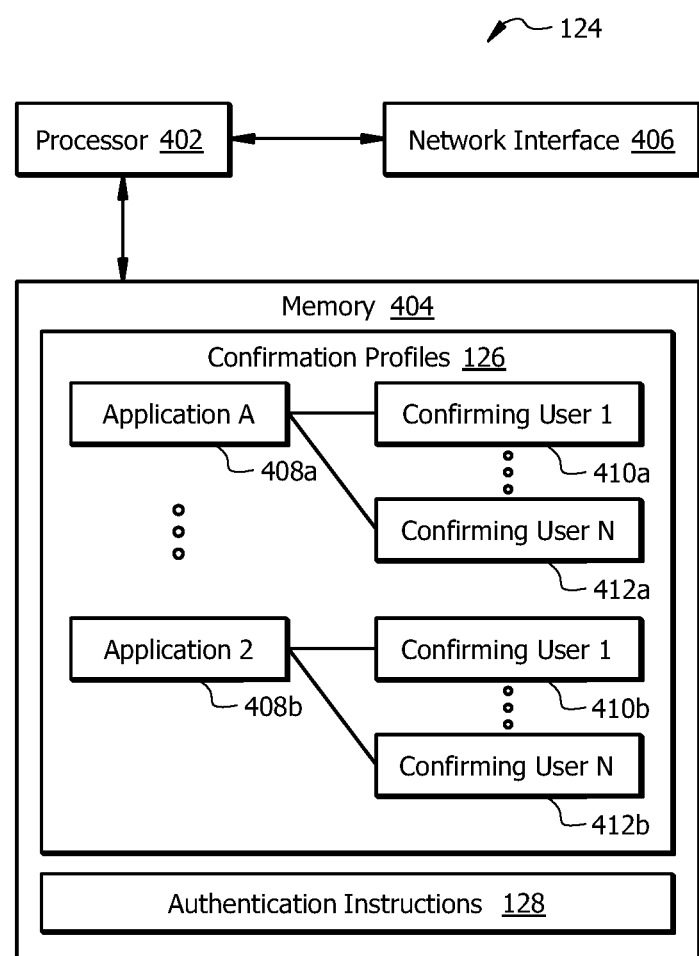
FIG. 4 is a block diagram of an example multi-person authentication server of the system of FIG. 1.
Figure 5:
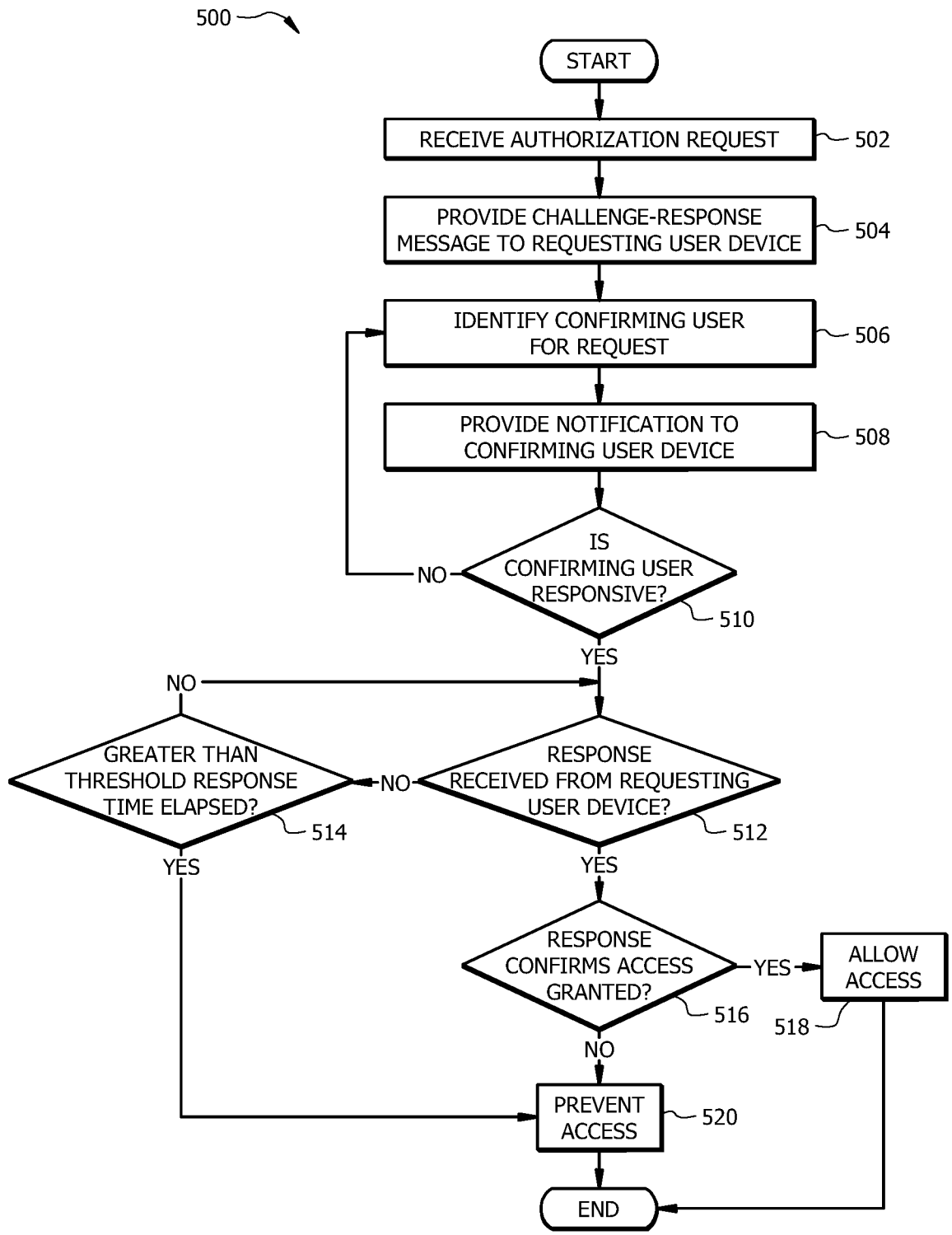
FIG. 5 is a flow diagram illustrating an example operation of the multi-person authentication server of FIGS. 1 and 4.
Figure 6:
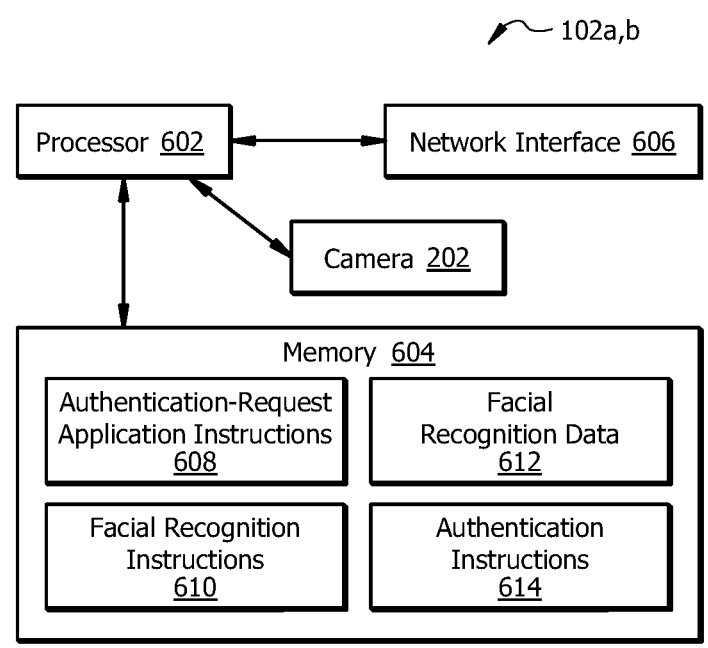
FIG. 6 is a block diagram of an example requesting user device of the system of FIG. 1.
Figure 7:
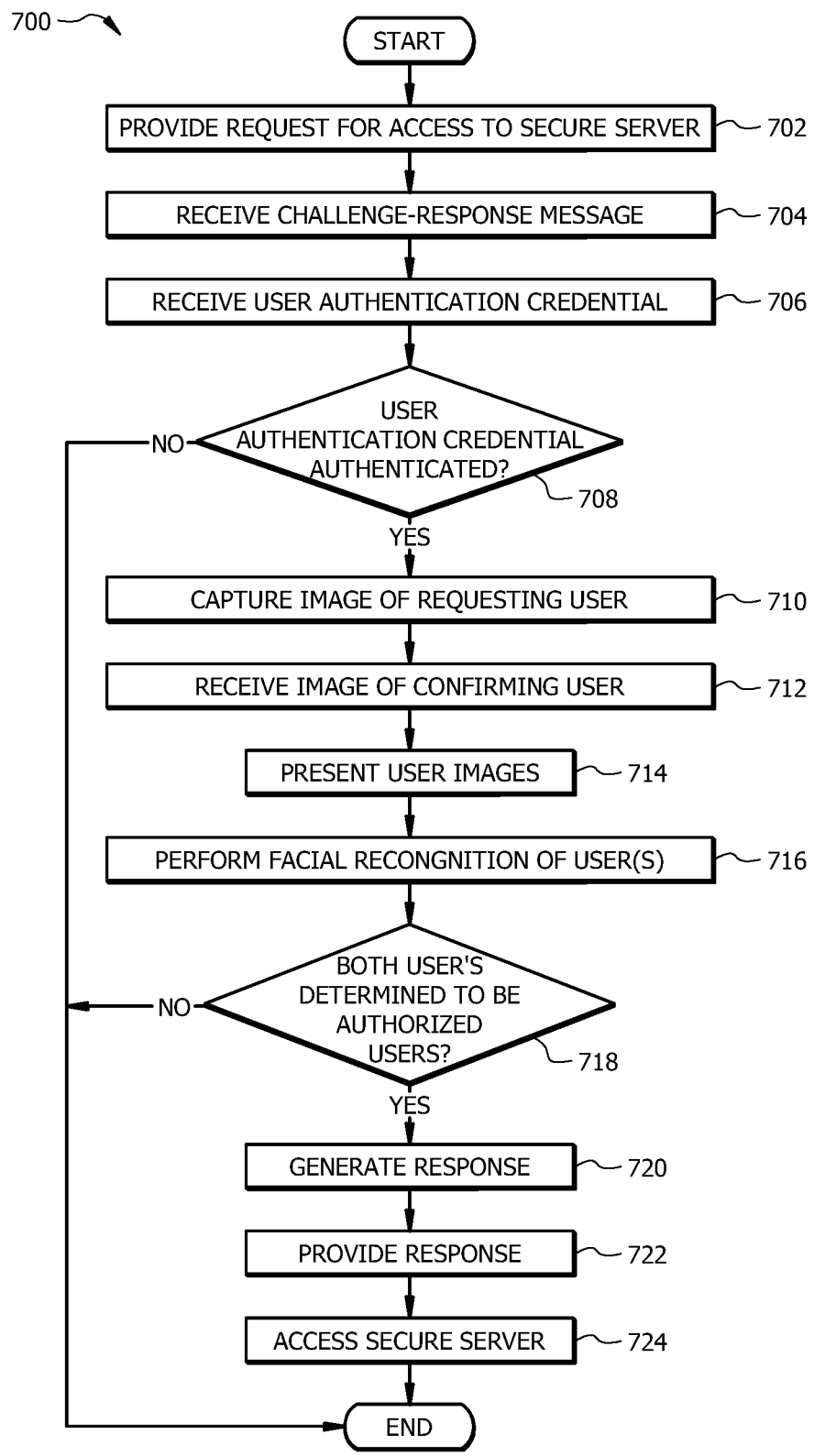
FIG. 7 is a flow diagram illustrating an example operation of the requesting user device of FIGS. 1 and 6.
Figure 8:
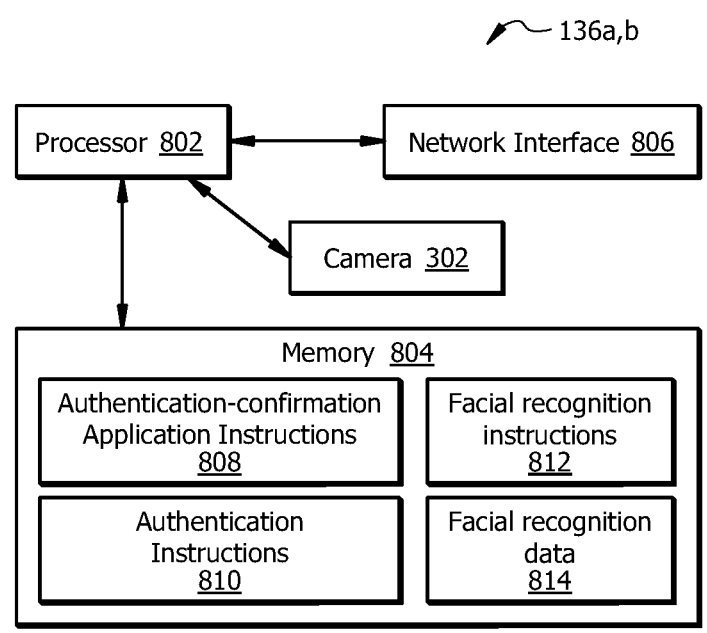
FIG. 8 is a block diagram of an example confirming user device of the system of FIG. 1.
Figure 9:
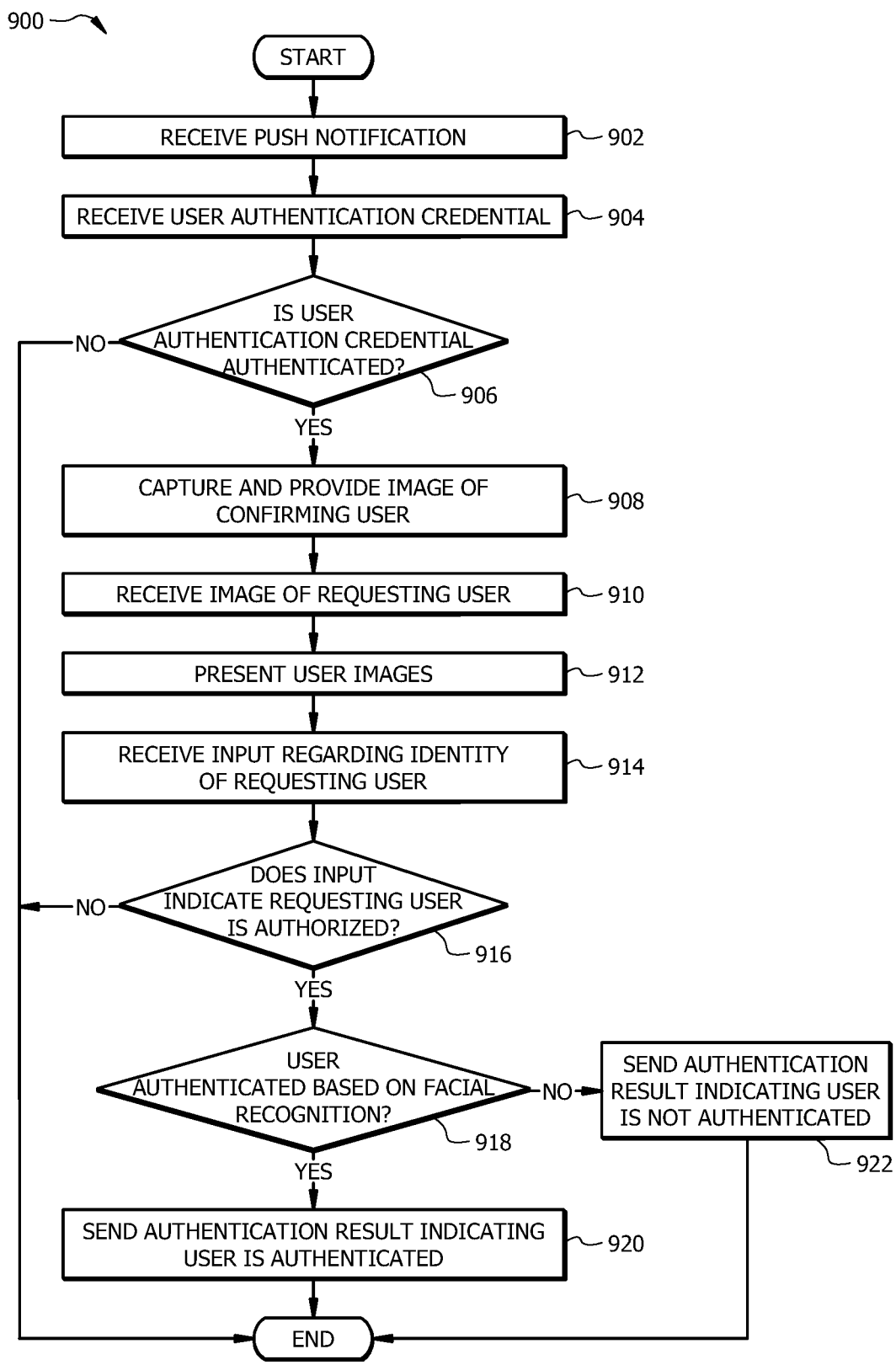
FIG. 9 is a flow diagram illustrating an example operation of the confirming user device of FIGS. 1 and 8.
Figure 10:
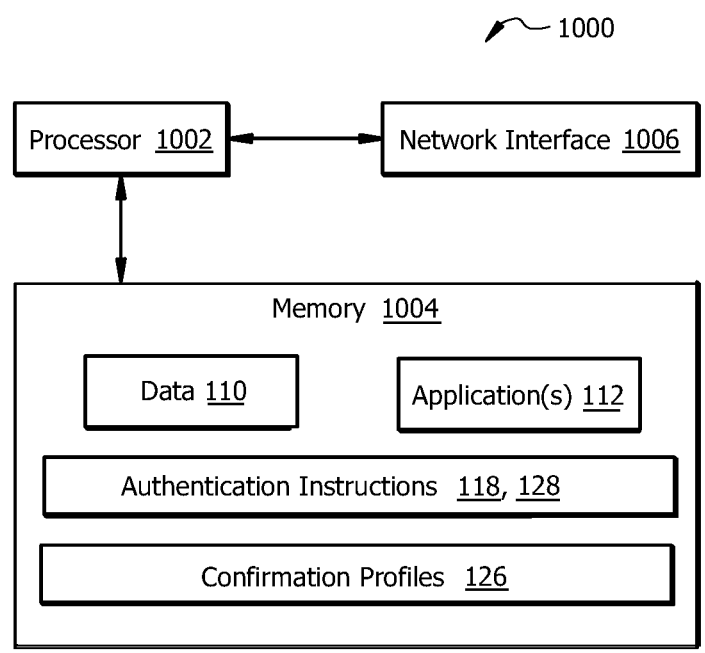
FIG. 10 is a block diagram of an example device for implementing other components of the system of FIG. 1.

As described above, previous authentication technology has several disadvantages. For instance, previous authentication strategies involving information (e.g., security credentials) provided by a single user may be susceptible to compromise by a single bad actor. This disclosure provides solutions to these and other problems of previous technology by facilitating multi-person user authentication. FIG. 1 illustrates an example system for performing multi-person authentication. FIGS. 2A-C illustrate views of a user interface presented on a device for requesting multi-person authentication. FIGS. 3A-3B illustrate views of a user interface presented on a device for confirming permission for multi-person authentication. FIGS. 4 and 5 illustrate an example multi-person authentication server and an example method of its operation. FIGS. 6 and 7 illustrate an example device for requesting multi-person authentication and an example method of its operation. FIGS. 8 and 9 illustrate an example device for confirming multi-person authentication and an example method of its operation. FIG. 10 illustrates an example device for implementing other components of the system of FIG. 1.

Multi-Person Authentication System

FIG. 1 is a schematic diagram of an example system 100 for the authentication of a user 104 to access a secure server 108. The system 100 includes one or more requesting user devices 102a,b, a secure server 108, an authentication server 116, a multi-person authentication server 124, and confirming user devices 134a,b. As described in greater detail below with respect to FIGS. 4 and 5, the multi-person authentication server 124 generally facilitates multi-person authentication by sending a challenge-response message 130 to an appropriate requesting user device 102a,b and a push notification to an appropriate confirming user device 134a,b in response to a request 122 for multi-person authentication.

The user devices 102a,b are generally any computing devices operable to provide a request 106 for access to the secure server 108, capture an image of the requesting user 104, receive a challenge-response message 130, and/or generate a corresponding verification response 138. In some embodiments, the requesting user 104 (e.g., the individual requesting access to the secure server 108) may operate more than one user device 102a,b to request and gain access to the secure server 108. For example, the user 104 may initially request access to the secure server 108 from a first user device 102a, such as a personal computer. Meanwhile, multi-person authentication may be performed through a second user device 102b, such as a smartphone, as illustrated in the example of FIG. 1. A user device 102a,b generally includes a user interface (e.g., a touchscreen, a display and keypad, and/or the like) operable to provide user input and display captured user images (see FIGS. 2A-2C). The user devices 102a,b also include a camera operable to capture an image of the user 104. Examples of the use of a user device 102a,b are described below with respect to FIGS. 2A-2C. An example user device 102a,b and its operation are also described with respect to FIGS. 6 and 7 below.

The secure server 108 is generally a suitable server (e.g., including a physical server and/or virtual server) operable to store secure data 110 and/or provide access to secure application(s) 112 or other services with restricted access. The secure data 110 may be data which should only be viewed or accessed by a user 104 who has been preapproved to have access to this data 110. For example, the secure data 110 may include personal information, private information, and/or the like. A secure application 112 may be an application which may be employed to review secure data 110 or to which access is otherwise restricted. The secure server 108 may be implemented using the processor, memory, and interface of the device 1000 described below with respect to FIG. 10.

The authentication server 116 is a device or collection of devices operable to perform an initial authorization of the requesting user 104 using single-user authentication (e.g., based on a security credential or the like provided with the user's request 106 to access the secure server 108). The authentication server 116 includes authentication instructions 118 which include any instructions, code, or rules for determining whether the requesting user 104 is initially authorized to request access to the secure server 108. For example, the authorization instructions 118 may include code for implementing a comparison of security credentials, such as a username and password combination, provided by the user 104 to a set of combinations of usernames and passwords that are associated with authorized users of the secure server 108. If the user 104 fails to pass this initial authentication (e.g., if the username and password do not match a predetermined username and password), then the user 104 may be denied access to the secure server 108. Otherwise, if the user 104 passes this initial authentication (e.g., if the username and password match a predetermined username and password), then further authentication tasks are performed by the multi-person authentication server 124 and user devices 102a,b, 134a,b. For example, a multi-person authentication request 122 may be directed to the multi-person authentication server 124, and user access may only be provided based on the confirmation/denial 140 of this access from the multi-person authentication server 124. The authentication server 116 may be implemented using the processor, memory, and interface of the device 1000 described below with respect to FIG. 10.

The multi-person authentication server 124 is a device or collection of devices operable to perform further authentication of the requesting user 104 based on a verification response 138 received from the user device 102a,b. As described further with respect to FIGS. 2A-2C, 6, and 7, the user device 102a,b determines the verification response 138 based on images of both the requesting user 104 and confirming user 136a,b. The multi-person authentication server 124 includes confirmation profiles 126 and authentication instructions 128. The confirmation profiles 126 include information for matching authentication requests 122 to appropriate confirming users 136a,b. For example, the confirmation profiles 126 may include an ordered list of confirming users 136a,b who should be instructed via notification 132a,b to participate in multi-person authentication (see also FIG. 6). The authentication instructions 128 include any instructions, code, or rules for determining whether the user 104 should be confirmed or denied access to the secure server 108 based on properties of the verification response 138 generated by the requesting user device 102a,b. An example multi-person authentication server 124 and its operation are described with respect to FIGS. 4 and 5 below.

While the authentication server 116 and multi-person authentication server 124 are shown as a separate components of the system 100, it should be understood that, at least in some embodiments, some or all of the servers 116 and 124 may be combined such that functions of the authentication server 116 may be performed by the multi-person authentication server 124 (described below). For instance, in some cases, an existing secure server 108 may already be configured to function in combination with an authentication server 116, which provides single-user authentication (e.g., based on a username and password, or the like). In such cases, the multi-person authentication server 124 may be added to the system 100, and a multi-person authentication request 122 may be routed to the multi-person authentication server 124 (e.g., rather than immediately allowing user access after passing the authentication functions of server 116). In other cases, a secure server 108 (e.g., that is not already deployed with a corresponding authentication server 116) may be coupled to a multi-person authentication server 124 that is also operable to perform the single-user authentication tasks of the authentication server 116.

The confirming user devices 134a,b are generally any computing devices operable to receive a push notification 132a,b associated with a request 122 for user authentication, capture an image of the user 136a,b operating the device 134a,b, perform facial recognition-based authentication of the user 136a,b, and provide an authentication result the requesting user device 102a,b. The image may be used by the requesting user device 102a,b to verify that the user 104 is authorized to access the secure server 108 (see FIGS. 2A-2C, 6, and 7). A user device 134a,b generally includes a user interface (e.g., a touchscreen, a display and keypad, and/or the like) operable to provide user input and display captured user images (see FIGS. 3A and 3B). The user devices 134a,b also include a camera operable to capture an image of the user 136a,b. Examples of the use of a user device 134a,b are described below with respect to FIGS. 3A and 3B. An example user device 134a,b and its operation are described with respect to FIGS. 8 and 9 below.

In an example operation of the system 100, a user 104 operates a first requesting device 102a to provide a request 106 for access to the secure server 112. For example, the user 104 may wish to view a portion of the data 110 stored in the server 108 and/or use an application 112 hosted by the server 108. The request 106 may include security credentials (e.g., a username and password) for accessing the secure server 108. In response to receiving the request 106, the secure server 108 may communicate with the authorization server 116 to determine whether the user 104 is initially authenticated to access the server 108. For example, the secure server 108 may provide an authentication request 114 to the authentication server 116. The request 114 may include the security credentials (e.g., the username and password) that the user 104 provided. The authentication server 116 uses the authentication instructions 118 to determine if the user 104 should be initially authenticated. For example, if the security credentials provided in the request 114 match predefined credentials associated with the authentication instructions 118, the authentication server 116 may determine that the user 104 is initially authenticated and that multi-person authentication should be performed. The authentication server 116 returns a confirmation or denial 120 of the initial single-user authentication performed by the server 116.

In a case where the authentication server 116 confirms that the user 104 is initially authenticated, the secure server 108 provides a multi-person authentication request 122 to the multi-person authentication server 124. The multi-person authentication request 122 may include an identifier of the user 104 and/or of a device 102a,b of the user 104. For example, if the user 104 uses the second requesting device 102b for multi-person identification, the request 122 may include an identifier of this device 102b such that multi-person authentication may be conducted via this device 102b (as described further with respect to FIGS. 2A-2C, 6, and 7 below). The request 122 may further include an identifier of the data 110 and/or application(s) 112 to which the user 104 is requesting access. This information may facilitate the identification of one or more confirming users 136a,b who are appropriate for further authenticating the user 104 via the confirming device 134a,b, as described further below with respect to FIGS. 3A-3B, 8, and 9).

Following receipt of the request 122 for multi-person authentication, the multi-person authentication server 124 sends a challenge-response message 130 to the requesting user device 102a,b. The multi-person authentication server 124 may use information included in the multi-person authentication request 122 (e.g., the identifier of the user 104 and/or the user device 102b) to determine which device 102a,b should receive the challenge-response message 130. The challenge-response message 130 generally includes instructions to begin facial-recognition based multi-person authentication with the user device 102a,b (see FIGS. 2A-2C and corresponding description below). In some cases, the challenge-response message 130 is sent to the same device 102a the user 104 operated to request access to the server 108 (e.g., the message 130 may be sent to the user's personal computer). However, in other cases such as is illustrated in FIG. 1, the challenge-response message 130 is provided to the second user device 102b that has been assigned the task of multi-person user authentication.

The multi-person authentication server 124 also determines one or more confirming users 136a,b who are appropriate for confirming an identity and/or the access privileges of the user 104. For example, the multi-person authentication server 124 may use the confirmation profiles 126 to identify a confirming user 136a,b who has administrative privileges over data 110 and/or application(s) 112 to which the user 104 is requesting access. The confirming user 136a,b may be an individual that is associated with the user 104 (e.g., is a manager of the user 104, works in a same organizational group as the user 104, etc.). The push notification 132a,b generally includes instructions for initiating acquisition of an image of the confirming user 136a,b, which is provided to the requesting device 102b, for example, to be used for facial recognition-based user authentication (see FIGS. 2A-2C and 3A-3B). If a first selected confirming user 136a is non-responsive for greater than a threshold time (e.g., of five minutes or so), then the multi-person authentication server 124 may cancel the notification 132a sent to the first confirming user 136a and send a second notification 132b to a second confirming user 136a,b. The second confirming user 136b may be the next person in the list of confirming users who have administrative privileges over data 110 and/or application(s) 112 requested by user 104 (see, e.g., FIGS. 4 and 5 and corresponding description below).

FIGS. 2A-2C illustrate views 200, 220, 250 of the user interface presented on the user device 102a,b at various stages in the multi-person authentication process using the authentication-request application. The device 102a,b includes a camera 202 and a display 204. The device 102a,b executes the authentication-request application which may implement at least a portion of the multi-person authentication process described in this disclosure. The display 204 is a touchscreen in the example of FIGS. 2A-2C. FIG. 2A shows a first view 200 presented on the display 204 of the device 102a,b. The view 200 includes a field 206 for entry of security credentials by the user 104 and a keypad 208 for entering security credentials (e.g., a PIN, password, or the like). Following entry of the security credentials and confirmation of the entered credentials (see FIGS. 6 and 7), the camera 202 captures an image 224 of the requesting user 104 and receives an image 222 of the confirming user 136a,b that is obtained by the confirming user device 134a,b.

View 220 of FIG. 2B shows a split screen presented on the display 204 of the device 102a,b with the image 222 of the confirming user 136a,b in one portion of the split screen and the image 224 of the requesting user 104 in another portion of the split screen. In some embodiments, the images 222 and 224 are part of corresponding video feeds obtained from devices 134a,b and 102a,b, respectfully. In such embodiments, the images 222, 224 may represent these video feeds, such that images 222, 224 appear as a video chat session between the requesting user 104 and the confirming user 136a,b. As shown in view 250 of FIG. 2C, facial recognition may be used to verify the identity of the requesting user 104 based on image 224. In some cases, the identity of the confirming user 136a,b may also be verified based on image 222 (e.g., if facial recognition-based authentication is not performed by the confirming device 134a,b). Regions 252, 254 near the faces of the images 222, 224 may be used to perform facial recognition. If the identities of both users 104, 136a,b are verified, a verification message 256 may be presented on the display 204 of the device 102a,b. The requesting device 102a,b and its operation are described in greater detail below with respect to FIGS. 6 and 7. While the examples of FIGS. 2A-2C illustrate multi-person authentication based on images 222, 224 of two users (e.g., a requesting user 104 and a single confirming user 136a,b), it should be understood that multi-person authentication could involve images of more than one confirming user 136a,b. For example, multi-person authentication may involve identity verification of the requesting user 104 and two or more of the confirming users 136a,b.

FIGS. 3A and 3B illustrate views 300, 350 of the user interface presented on the confirming device 134a,b at various stages in the multi-person authentication process using the authentication-confirmation application. The device 134a,b includes a camera 302 and a display 304, which may be the same or similar to the camera 202 and display 204 described above with respect to FIGS. 2A-2C. The device 102a,b executes the authentication-confirmation application which may implement at least a portion of the multi-person authentication process described in this disclosure. FIG. 3A shows a first view 300 presented on the display 304 of the device 134a,b. The view 300 includes a field 306 for entry of security credentials by the user 136a,b and a keypad 308 for entering the security credentials. Following entry of the security credentials and confirmation of the entered credentials (see FIGS. 8 and 9), the camera 302 captures an image 352 of the confirming user 136a,b and may receive an image 354 of the requesting user 104 that is obtained by the requesting user device 102a,b.

View 350 of FIG. 3B shows a split screen presented on the display 304 of the device 134a,b with the image 352 of the confirming user 136a,b in one portion of the display 304 and the image 354 of the requesting user 104 in another portion of the display 304. Image 352 and 354 may be the same as images 222 and 224, respectively, of FIGS. 2B and 2C, described above. Similarly to as described above for FIG. 2B, in some embodiments, the images 352 and 354 are part of corresponding video feeds obtained from devices 134a,b and 102a,b, respectfully. In such embodiments, the images 352, 354 may represent these video feeds, such that images 352, 354 appear as a video chat session between the requesting user 104 and the confirming user 136a,b. In some embodiments, the confirming device 134a,b uses facial recognition to verify that the identity of the confirming user 136a,b corresponds to an identity of an individual who is authorized to confirm access to the secure server 108. In other embodiments, the image 352 may be provided to the requesting device 102a,b, and the requesting device 102a,b may use the image (e.g., image 222 in FIGS. 2B and 2C) to authenticate the requesting user 136a,b. If the identities of both users 104, 136a,b are verified, a verification message 362 may be presented on the display 304 of the device 134a,b.

In some cases, the authentication-confirmation application may present a request 356 for the confirming user 136a,b to indicate whether the image 354 corresponds to a user who is known to have permission to access the secure server 108. The confirming user 136a,b may provide an input to confirm (e.g., by selecting the "YES" button 358) or deny (e.g., by selecting the "NO" button 360) that the user 104 should be granted access to the secure server 108. If the confirming user 136a,b confirms that the image 354 is of an authorized user of the secure server 108, then the user 136a,b may be authenticated using facial recognition as described above or the image 354 may be provided for use by the requesting device 102b (e.g., the image 354 may be transmitted via the multi-person authentication server 124 or another network such that it may be used as image 222 of FIGS. 2B and 2C for facial recognition-based user authentication). The confirming device 134a,b and its operation are described in greater detail below with respect to FIGS. 8 and 9.

Returning to FIG. 1, the user device 102a,b provides a verification response 138 indicating whether the user 104 has been verified (e.g., based on the results of the facial recognition-based verification illustrated in FIG. 2C). The multi-person authentication server 124 then provides a confirmation or denial 140 of access to the secure server 104, and the secure server 108 uses the confirmation or denial 140 to either provide or deny access to the secure server 108. The determination and provision of the confirmation or denial 142 of access to the secure server 108 is described in greater detail below with respect to FIGS. 4 and 5.

Example Multi-Person Authentication Server and its Operation

FIG. 4 is an example of a multi-person authentication server 124 of FIG. 1. The multi-person authentication server 124 includes at least one processor 402, at least one memory 404, and a network interface 406. The multi-person authentication server 124 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 5. In some embodiments, the function described herein is implemented using logic units, FPGAs, ASICs, DSPs, or any other suitable hardware or electronic circuitry.

The memory 404 is operable to store any of the information described with respect to FIGS. 1 and 5 along with any other data, instructions, logic, rules, or code operable to implement the function(s) described herein when executed by processor 402. For example, the memory 404 may store confirmation profiles 126 and authentication instructions 128. As described above with respect to FIG. 1, the confirmation profiles 126 may include an ordered list of confirming users 136a,b who should be contacted (via notification 132a,b) to participate in multi-person authentication. For example, as illustrated in FIG. 4, the confirmation profiles 126 may include for each application 408a,b hosted on the secure server 108, a set of confirmation user identities 410a,b, 412a,b. When multi-person authentication is requested to access a given application 408a,b (i.e., based on receipt of request 122 of FIG. 1), the multi-person authentication server 124 may first provide a notification 132a,b to the user 136a,b corresponding to the initial confirming user identity 410a,b. Users 136a,b corresponding to subsequent confirming user identities 412a,b in the set or list of users for the requested application 408a,b may be contacted if a confirming user 136a,b corresponding to the initial user identity 410a,b is unresponsive to the notification 132a,b (e.g., within a predefined time limit). The authentication instructions 128 include any instructions, code, or rules for determining whether the user 104 should be confirmed or denied access to the secure server 108 based on properties of the verification response 138 generated by the requesting user device 102a,b. For instance, the authentication instructions 128 may include instructions to confirm access is granted if the user 104 is verified by the device 102a,b (see FIG. 2C and corresponding description above). The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the multi-person authentication server 124 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

FIG. 5 is a flow diagram illustrating an example method 500 of multi-person authentication. The method 500 may be implemented using the multi-person authentication server 124 of FIGS. 1 and 4. As described above with respect to FIGS. 1 and 4, the multi-person authentication server 124 facilitates multi-person authentication based on information (e.g., images and/or security credentials) provided by both a user 104 who is requesting access to a secure server 108 and a confirming user 136a,b who has appropriate administrative privileges for verifying that the user 104 should be allowed access to the secure server 108. The method 500 may begin at step 502 where a multi-person authentication request 122 is received by the multi-person authentication server 124. The multi-person authentication request 122 may include an identifier of the user 104 and/or of a device 102a,b of the user 104. For example, if the user 104 uses his/her second device 102b for executing an authentication-request application, the request 122 may include an identifier of this device 102b such that certain multi-person authentication tasks may be conducted via this device 102b (see FIGS. 6 and 7 and corresponding description below). The multi-person authentication request 122 may further include an identifier of the data 110 and/or application(s) 112 to which the user 104 is requesting access. This information may facilitate the identification of one or more confirming users 136a,b to whom a notification 132a,b should be provided (see step 508).

At step 504, the multi-person authentication server 124 provides a challenge-response message 130 to a requesting user device 102a,b. For example, the multi-person authentication server 124 may identify, based on user information included in the multi-person authentication request 122, a device 102a,b to which the challenge-response message 130 should be sent and may send this message 130 to the identified device 102a,b. The challenge-response message 130 includes instructions to begin multi-person authentication tasks at the user device 102a,b (see FIGS. 2A-2C and corresponding description above and FIGS. 6 and 7 and corresponding description below). For example, the challenge-response message 130 may indicate that user authentication is needed for the requesting user 104 based on one or both of a security credential (see FIG. 2A) and facial recognition (see FIG. 2C). The challenge-response message 130 may indicate a number of confirming users 136a,b required to achieve multi-person authentication and the type of multi-person authentication needed. For instance, the challenge-response message 130 may include an indication of whether the confirming user 136a,b needs to provide an indication that the requesting user 104 is approved for access (see request 356 of FIG. 3B), how many confirming user images (e.g., images 252 of FIGS. 2A and 2C) are needed to achieve multi-person authentication, and the like.

At step 506, the multi-person authentication server 124 identifies one or more confirming users 136a,b to whom a notification 132a,b should be sent for multi-person authentication. For example, the confirmation profiles 126 may be used to identify a confirming user 136a,b who is appropriate for authenticating the user 104 based on the identity of the user 104, a group in which the user 104 works, data 110 to which the user 104 is requesting access, and/or application(s) 112 to which the user 104 is requesting access. For instance, if the user 104 is requesting to access a given application 408a,b, the multi-person authentication server 124 may identify an initial confirming user identity 410a,b corresponding to a confirming user 136a,b to whom a notification should be sent first to authenticate sue of this application 408a,b (see FIG. 4).

At step 508, the multi-person authentication server 124 provides the notification 132a,b to the device 134a,b of the user 136a,b identified at step 506. The notification 132a,b includes instructions for initiating a simultaneous acquisition of an image 222 of the confirming user 136a,b. In some cases, authentication of the users 104 and 136a,b may only proceed once the images 222, 224 are visible on the display 204 of the device 102a,b. Facial recognition may be performed on each user's 104 and 136a,b corresponding device 102a,b or 136a,b, respectively, as described above. For example, an authentication result may be provided to the requesting device 102b.

At step 510, the multi-person authentication server 124 determines if the confirming user 136a,b is responsive (e.g., within a predetermined time limit). For example, the multi-person authentication server 124 may determine whether the confirming device 134a,b has been operated by the confirming user 136a,b to begin the confirming user's portion of the multi-person authentication process, for example, by entering a security credential (see FIG. 3A) and/or capturing an image 222 of the confirming user 136a,b (see FIG. 3B). If the confirming user 136a,b is not responsive, the multi-person authentication server 124 may return to step 506 to identify a different confirming user 136a,b (e.g., a subsequent confirming user 412a,b for the application 408a,b to which the user 104 is requesting access). Otherwise, if the confirming user 136a,b is responsive, the multi-person authentication server 124 may proceed to step 512.

At step 512, the multi-person authentication server 124 determines whether a verification response 138 is received from the requesting user device 102a,b. As described above with respect to FIGS. 1 and 2A-2C, the verification response 138 generally indicates whether or not the user 104 and user 136a,b have been verified (e.g., based on the results of the facial recognition-based verification illustrated in FIGS. 2C and 3B). Facial recognition may be performed simultaneously on the requesting user device 102a,b (e.g., to authenticate the requesting user 104) and the confirming user device 134a,b (e.g., to authenticate the confirming user 136a,b). The multi-person authentication server 124 may receive authentication results from the requesting user device 102a,b and the confirming user device 134a,b (i.e., the verification response 138 may represent these results received from the respective user devices 102a,b and 136a, b). If a verification response 138 is not received, the multi-person authentication server 124 may proceed to step 514 to determine whether greater than a threshold response time (e.g., of five minutes or so) has elapsed, and if this is the case, access to the secure server 108 may be prevented at step 520. However, if the threshold response time has not elapsed, the multi-person authentication server 124 may continue to wait for the verification response 138 to be received. When the multi-person authentication server 124 determines that the verification response 138 is received at step 512, the multi-person authentication server 124 proceeds to step 516.

At step 516, the multi-person authentication server 124 determines if the requesting user 104 should be permitted to access the secure server 108. For example, the multi-person authentication server 124 may use the authentication instructions 128 to interpret the verification response 138 and determine whether user access should be granted. For example, the authentication instructions 128 may indicate that the user 104 should be permitted to access the secure server 108 if user credentials entered in the requesting device 102a,b are correct (see FIG. 2A) and image verification is successful (see FIG. 2B). In some embodiments, the authentication instructions 128 may further require that the confirming user 136a,b has confirmed that the requesting user 104 is known to be approved to access the secure server 108 (see request 356 of FIG. 3B).

If the multi-person authentication server 124 determines that access should be granted at step 516, the multi-person authentication server 124 may instruct the secure server 108 to allow the user 104 to access the secure server 108 at step 518 (e.g., or access at least the requested data 110 and/or application(s) 112). Otherwise, if the multi-person authentication server 124 determines that access should not be granted at step 516, the multi-person authentication server 124 may instruct the secure server 108 to prevent the user 104 from accessing the secure server 108 at step 520.

Example Requesting User Device and its Operation

FIG. 6 is an example of a requesting user device 102a,b of FIGS. 1 and 2A-2C. The requesting user device 102a,b includes a processor 602, a memory 604, a network interface 606, and a camera 202. The requesting user device 102a,b may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604 and the network interface 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1, 2A-2C, and 7. In some embodiments, the function described herein is implemented using logic units, FPGAs, ASICs, DSPs, or any other suitable hardware or electronic circuitry.

The memory 604 is operable to store any of the information described with respect to FIGS. 1, 2A-2C, and 7 along with any other data, instructions, logic, rules, or code operable to implement the function(s) described herein when executed by processor 602. For example, the memory 604 may store authentication-request application instructions 608 which include any code, logic, and/or rules for implementing the authentication-request application using the processor 602. The memory 604 may store facial recognition instructions 610 and facial recognition data 612. The facial recognition instructions 610 include any code, logic, and/or rules for implementing facial recognition (e.g., the identification of users 104, 136a,b based on images 222, 224 of FIGS. 2B and 2C). The facial recognition data 612 includes the information used by the facial recognition data 612 to verify user identity based on images. For instance, the facial recognition data 612 may include previously obtained images of users' faces and/or measurable characteristics of such images, which may be used to verify user identity by comparison to characteristics determined from new user images (e.g., images 222, 224 of FIGS. 2A and 2B). The memory 604 may further store authentication instructions 614 which include any logic, code, or rules for authenticating users, for example via entry of security credentials (see, e.g., FIG. 2A regarding the entry of security credentials to operate the authentication-request application on device 102b). The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The network interface 606 is configured to enable wired and/or wireless communications. The network interface 606 is configured to communicate data between the requesting user device 102a,b and other network devices, systems, or domain(s). For example, the network interface 606 may comprise a WIFI interface, a local area network (LAN) interface, a wide area network (WAN) interface, a modem, a switch, or a router. The processor 602 is configured to send and receive data using the network interface 606. The network interface 606 may be configured to use any suitable type of communication protocol as would be appreciated by one of ordinary skill in the art.

The camera 202 is configured to obtain an image of the user 104. Generally, the camera 202 may be any type of camera. For example, the camera 202 may include one or more sensors, an aperture, one or more lenses, and a shutter. The camera 202 is in communication with the processor 602, which controls operations of the camera 202 (e.g., opening/closing of the shutter, etc.). Data from the sensor(s) of the camera 202 may be provided to the processor 602 and stored in the memory 604 in an appropriate image format for facial recognition using the facial recognition instructions 610.

FIG. 7 is a flow diagram illustrating an example method 700 of multi-person authentication. The method 700 may be implemented using the requesting user device 102a,b of FIGS. 1, 2A-C, and 6. The method 700 may begin at step 702 where a request 106 for access to the secure server 108 is sent. For example, a user 104 of the requesting device 102a,b may provide an input which corresponds to a request to access the secure server 108 (e.g., the user 104 may navigate to a web portal used to access data 110 and/or application(s) 112). The request 106 may include an identifier of the requesting device 102a,b, the requesting user 104, data 110 to which access is requested, and/or application(s) 112 to which access is requested. In some cases, the request 106 may include or be provided along with security credentials (e.g., for achieving an initial authentication performed by the authentication server 116).

At step 704, the requesting device 102a,b (which may be the same device 102a,b that sent the request 106 at step 702 or a different device 102a,b) receives a challenge-response message 130. The challenge-response message 130 may be received from the multi-person authentication server 124 described above with respect to FIGS. 1, 4, and 5. The challenge-response message 130 may include instructions to begin facial-recognition based multi-person authentication, as described in subsequent steps 706 to 722.

At step 706, the requesting device 102a,b receives security credentials for beginning multi-person authentication operations. For example, the requesting user 104 may input the security credentials as illustrated in FIG. 2A, described above. At step 708, the requesting device 102a,b determines if the received security credentials are authenticated. For example, the requesting device 102a,b may use the authentication instructions 614 to determine if the security credentials received at step 706 match predefined credentials for the user 104. If the security credentials are not authenticated at step 708, the method 700 generally ends. Otherwise, if the security credentials are authenticated at step 708, the requesting device 102a,b proceeds to step 710.

At step 710, the requesting device 102a,b captures an image 224 of the requesting user 104 and receives an image 222 of the confirming user 136a,b at the same time (see FIGS. 2B-2C). The captured image 224 generally includes at least a portion of the face of the requesting user 104. The authentication-request application may automatically begin operating the camera 202 of the requesting device 102a,b in order to capture the image 224 of the user 104. In some cases, the image 224 may be automatically captured when an acceptable view (i.e., a view which includes a large enough portion of the user's face) is included in the image 224 and presented in a portion of the device's display 204 (see FIG. 2B). Similarly, the image 22 of the confirming user 136a,b may also include at least a portion of the face of the user 136a,b such that facial recognition-based authentication may be performed the confirming user device 134a,b and/or the requesting device 102a,b. In some cases, the user 104 may press an appropriate button on the device 102a,b to capture the image 224.

At step 712, the requesting device 102a,b receives an image 222 (e.g., image 532 of FIG. 3B) of the confirming user 136a,b. For example, the confirming user 136a,b identified by the multi-person authentication server 124 (see step 506 of FIG. 5) may capture an image 222 of himself/herself (see image 352 of FIG. 3B and step 908 of FIG. 9), and this image 222 may be provided to the requesting device 102a,b.

At step 714, the images 222 and 224 of the confirming user 136a,b and requesting user 104 may be presented on the display of the device 102a,b. For example, images 222, 224 may be presented in different portions of the display 204 of the device 102a,b, as illustrated in FIG. 2B. In some embodiments, the images 222, 224 are presented as videos, similar to a video chat session, as described with respect to FIG. 2B above.

At step 716, the requesting device 102a,b uses facial recognition to identify the requesting user 104 based on image 224. For example, in cases where facial recognition is performed by the both the requesting user device 102a,b and the confirming user device 134a,b, the requesting device 102a,b may use the facial recognition instructions 610 to identify user 104 and receive authentication results from device 134a,b regarding whether the confirming user 136a,b is authenticated. The facial recognition instructions 610 may be used to identify the user 104 based on a comparison of his/her corresponding image 224 (see FIGS. 2B and 2C) to previously obtained images of the user 104. Any appropriate method of facial recognition may be used to identify user 104. As an example, the requesting device 102a,b may use facial recognition instructions 610 to identify a previous image of the face of the user 104 and compare image 224 to this previous image. A similarly score (e.g., a measure of the extent to which features in the previous image and image 224 are the same or similar) may be determined for the image 224. If the similarity score is greater than a threshold value, the requesting device 102a,b may determine that the user 104 is verified as an authorized user of the secure server 108. A similar approach may be used by the confirming user device 134a,b to verify the identity of the confirming user 136a,b based on image 352 (see FIG. 3B). For example, a similarly score (e.g., a measure of the extent to which features in a previous image of the confirming user 136a,b and image 352 are the same or similar) may be determined for the image 352. If the similarity score is greater than a threshold value, the confirming device 134a,b may determine that the user 136a,b is verified as an authorized administrator of the secure server 108. This verification may be sent as an authentication result to device 102a,b to generate the verification response 138 to the challenge-response message 130 sent from multi-person authentication server 124. In cases, where facial recognition is only performed by the requesting user device 102a,b, the requesting device 102a,b may use the facial recognition instructions 610 to identify each user 104, 136a,b participating in multi-person authentication, similarly to as described above.

At step 718, the requesting device 102a,b determines, based on the results of facial recognition at step 716, if both users 104 and 136a,b are confirmed to be authorized users and/or administrators. For example, the requesting device 102a,b may determine whether the identity of the requesting user 104 (e.g., based on the identity determined from image 224) matches an identity of a predetermined authorized user of the secure server 108 and whether an authentication result from the confirming user device 134a,b indicates that 136a,b is authenticated (e.g., that the identity of confirming user 136a,b matches an identity of in individual with administrative privileges over the secure server 108). For example, the requesting user device 102a,b and confirming user device 134a,b may determine if faces in images 224 and 352 match previously captured images of faces in the facial recognition data 612 and 814 that correspond to authorized users and/or administrators of the secure server 108.

At step 720, the requesting device 102a,b generates a verification response 138 that indicates that the user 104 should be granted access to the secure server 108. At step 722 the verification response 138 is sent to the multi-person authentication server 124 described above with respect to FIGS. 1, 4, and 5. After the verification response 138 is sent, the user device 102a,b may access the secure server 108 at step 724. For example, the requesting device 102a,b may access requested data 110 and/or application(s) 112, such that the user 104 may view requested data 110 and/or use requested application(s) 112.

Example Confirming User Device and its Operation

FIG. 8 is an example of a confirming user device 134a,b of FIGS. 1 and 3A-3B. The confirming user device 134a,b includes a processor 802, a memory 804, a network interface 806, and a camera 302. The confirming user device 134a,b may be configured as shown or in any other suitable configuration.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804 and the network interface 806. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1, 3A-3B, and 9. In some embodiments, the function described herein is implemented using logic units, FPGAs, ASICs, DSPs, or any other suitable hardware or electronic circuitry.

The memory 804 is operable to store any of the information described with respect to FIGS. 1, 3A-3B, and 9 along with any other data, instructions, logic, rules, or code operable to implement the function(s) described herein when executed by processor 802. For example, the memory 804 may store authentication-confirmation application instructions 808 which include any code, logic, and/or rules for implementing the authentication-confirmation application using the processor 802. The memory 804 may further store authentication instructions 810 which include any logic, code, or rules for authenticating users 136a,b, for example, via entry of security credentials (see, e.g., FIG. 3A regarding the entry of security credentials to operate the authentication-confirmation application on device 134a,b). The memory 804 may store facial recognition instructions 812 and facial recognition data 814. The facial recognition instructions 812 include any code, logic, and/or rules for implementing facial recognition (e.g., the identification of user 136a,b based on image 352 of FIG. 3B). The facial recognition data 814 includes the information used by the facial recognition data 814 to verify user identity based on images. For instance, the facial recognition data 814 may include previously obtained images of users' faces and/or measurable characteristics of such images, which may be used to verify user identity by comparison to characteristics determined from new user images (e.g., images 352 of FIG. 3B). The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The network interface 806 is configured to enable wired and/or wireless communications. The network interface 806 is configured to communicate data between the confirming user device 134a,b and other network devices, systems, or domain(s). For example, the network interface 806 may comprise a WIFI interface, a local area network (LAN) interface, a wide area network (WAN) interface, a modem, a switch, or a router. The processor 802 is configured to send and receive data using the network interface 806. The network interface 806 may be configured to use any suitable type of communication protocol as would be appreciated by one of ordinary skill in the art.

The camera 302 is configured to obtain an image of the user 136a,b. Generally, the camera 302 may be any type of camera. For example, the camera 302 may include one or more sensors, an aperture, one or more lenses, and a shutter. The camera 302 is in communication with the processor 802, which controls operations of the camera 302 (e.g., opening/closing of the shutter, etc.). Data from the sensor(s) of the camera 302 may be provided to the processor 802 and stored in the memory 804 in an appropriate image format (e.g., for facial recognition using the facial recognition instructions 812 of the confirming user device 134a,b).

FIG. 9 is a flow diagram illustrating an example method 900 of multi-person authentication. The method 900 may be implemented using the confirming user device of FIGS. 1, 3A-3B, and 8. The method 900 may begin at step 902 where a push notification 132a,b is received by the confirming user device 134a,b. The push notification 132a,b may include instructions to initiate acquisition of an image 352 of the confirming user 136a,b and provide the image 354 and, in some cases, an authentication result to the requesting device 102b, for example, to determine whether users 104 and 136a,b are authenticated and provide a corresponding verification response 138 to the challenge-response message 130 sent by the multi-person authentication system 124.

At step 904, the confirming user device 134a,b receives security credentials for beginning multi-person authentication operations. For example, the confirming user 136a,b may input security credentials as illustrated in FIG. 3A, described above. At step 906, the confirming user device 134a,b determines if the received security credentials are authenticated. For example, the confirming user device 134a,b may use the authentication instructions 910 to determine if the security credentials received at step 904 match predefined credentials for the user 136a,b. If the security credentials are not authenticated at step 906, the method 900 generally ends. Otherwise, if the security credentials are authenticated at step 906, the confirming user device 134a,b proceeds to step 908.

At step 908, the confirming user device 134a,b captures an image 352 of the confirming user 136a,b (see FIG. 3B). The captured image 352 may also be provided to the requesting user device 102a,b such that it may be displayed as image 222 of FIGS. 2B and 2C). The captured image 352 generally includes at least a portion of the face of the confirming user 136a,b. The authentication-confirmation application may automatically begin operating the camera 302 of the confirming user device 134a,b in order to capture the image 352 of the user 136a,b if user 104 is also in frame. In some cases, the user 136a,b may press an appropriate button on the device 134a,b to capture the image 352.

At step 910, the confirming user device 134a,b receives an image 354 of the requesting user 104. For example, the user 104 requesting access to the secure server 108 may capture on image 354 of himself/herself (see FIG. 2B and step 710 of FIG. 7), and this image 354 (e.g., image 224 of FIG. 2B-2C) may be provided to the confirming user device 134a,b. At step 912, the images 352 and 354 of the confirming user 136a,b and requesting user 104 may be presented on the display of the device 134a,b. For example, images 352, 354 may be presented in different portions of the display 304 of the device 134a,b, as illustrated in FIG. 3B. In some embodiments, the images 352, 354 are presented as videos, similar to a video chat session, as described with respect to FIG. 3B above At step 914, the confirming user device 134a,b may optionally receive an input regarding whether the image 354 of the requesting user 104 is an image of a known approved user of the secure server 108. For example, as illustrated in FIG. 3B, an input may confirm (e.g., via a user 136a,b selection of the "YES" button 358) or deny (e.g., by selecting the "NO" button 360) the user 104 access to the secure server 108. At step 916, the confirming user device 134a,b determines if the input from step 914 corresponds to the user 104 being approved to access the secure server 108. For example, if the input received at step 914 corresponds to a confirmation that the user 104 should be allowed to access the secure server 108 (e.g., if the input is a selection of the "YES" button 358 of FIG. 3B), then the confirming user device 134a,b provides the image 352 of the confirming user 136a,b, for example, such that it may be used by the requesting user device 102a,b for multi-person authentication (see, e.g., image 224 of FIGS. 2B-2C and steps 712, 716, and 718 of FIG. 7). Otherwise, if the input received at step 914 corresponds to a denial of permission for the request of the user 104 to access the secure server 108 (e.g., if the input is a selection of the "NO" button 360 of FIG. 3B), the image 252 may not be provided for use by the requesting user device 102a,b, such that the user 104 cannot be authenticated.

At step 918, the confirming user device 134a,b uses facial recognition to identify the confirming user 136a,b based on image 352. For example, in cases where facial recognition is performed by the both the requesting user device 102a,b and the confirming user device 134a,b, the confirming user device 134a,b may use the facial recognition instructions 812 to identify user 136a,b. The facial recognition instructions 812 may be used to identify the user 136a,b based on a comparison of his/her corresponding image 352 (see FIG. 3B) to previously obtained images of the user 136a,b. Any appropriate method of facial recognition may be used to identify user 136a,b. As an example, the confirming user device 134a,b may use facial recognition instructions 812 to identify a previous image of the face of the user 136a,b and compare image 352 to this previous image. A similarly score (e.g., a measure of the extent to which features in the previous image and image 352 are the same or similar) may be determined for the image 352. If the similarity score is greater than a threshold value, the confirming user device 134a,b may determine that the user 104 is verified as an authorized user of the secure server 108 at step 920. 920 results If at step 920, the confirming user device 134a,b determines that the confirming user 136a,b is authenticated, the confirming user device 134a,b may provide authentication results, for use by device 102a,b, indicating the user 136a,b is authenticated at step 922. If the user 104 is also verified by device 102a,b, the confirming user device 134a,b may receive an indication of this and display an indicator 366 reflecting that the user 136a,b and the user 104 are verified. If at step 920, the confirming user device 134a,b determines that the confirming user 136a,b is not authenticated, the confirming user device 134a,b may provide authentication results, for use by device 102a,b, indicating the user 136a,b is authenticated at step 924. In such cases, the requesting user 104 is not allowed to access the secure server 108.

Example Devices for Other System Components

FIG. 10 is an embodiment of a device 1000 which may be used to implement various components of the system 100 illustrated in FIG. 1. For example, each of the secure server 108, the authentication server 116, and the multi-person authentication server 124 of FIG. 1 may be implemented using a corresponding device 1000 or a corresponding collection of devices 1000. The device 1000 includes a processor 1002, a memory 1004, and a network interface 1006. The device 1000 may be configured as shown or in any other suitable configuration.

The processor 1002 comprises one or more processors operably coupled to the memory 1004. The processor 1002 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1002 may be a programmable logic device, a microcontroller, a microprocessor, or any suitable combination of the preceding. The processor 1002 is communicatively coupled to and in signal communication with the memory 1004 and the network interface 1006. The one or more processors are configured to process data and may be implemented in hardware or software. For example, the processor 1002 may be 8-bit, 16-bit, 32-bit, 64-bit or of any other suitable architecture. The processor 1002 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein. In some embodiments, the function described herein is implemented using logic units, FPGAs, ASICs, DSPs, or any other suitable hardware or electronic circuitry.

The memory 1004 is operable to store any of the information described above with respect to FIGS. 1-9 along with any other data, instructions, logic, rules, or code operable to implement the function(s) of the secure server 108 and/or authentication server 116 described herein when executed by processor 1002. For example, the memory 1004 may store the data 110, code for application(s) 112, the authentication instructions 118, 128, and/or the confirmation profiles, which are described above with respect to FIGS. 1, 4, and 5.

The memory 1004 comprises one or more disks, tape drives, or solid-state drives, and may be used as an over-flow data storage device, to store programs when such programs are selected for execution, and to store instructions and data that are read during program execution. The memory 1004 may be volatile or non-volatile and may comprise read-only memory (ROM), random-access memory (RAM), ternary content-addressable memory (TCAM), dynamic random-access memory (DRAM), and static random-access memory (SRAM).

The network interface 1006 is configured to enable wired and/or wireless communications. The network interface 1006 is configured to communicate data between the device 1000 and other network devices, systems, or domain(s). For example, the network interface 1006 may comprise a WIFI interface, a local area network (LAN) interface, a wide area network (WAN) interface, a modem, a switch, or a router. The processor 1002 is configured to send and receive data using the network interface 1006. The network interface 1006 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
a secure server configured to host one or more secure applications; and
a multi-person authentication server comprising:
a network interface configured to communicate with the secure server, a first user device associated with a first user, and a second user device associated with a second user; and
a processor configured to:
receive an authentication request corresponding to a request to provide the first user access to the secure server;
in response to receiving the authentication request:
provide a challenge-response message to the first user device, wherein the challenge-response message indicates authentication of the first user of the first user device is needed, directs the first user device to capture a first image of a face of the first user, and indicates a number of confirming users required to achieve a multi-person authentication; and
provide a push notification to the second user device, wherein the push notification indicates confirmation of the authentication of the first user of the first user device is needed, directs the second user device to capture a second image of a face of the second user, and instructs the second user device to provide the second image or an authentication result of authenticating the second image to the first user device, wherein the first user device is configured to:
perform a facial recognition process on the first image and the second image to:
determine a first similarity score by comparing the first image to an image of an authorized user of the secure server;
compare the first similarity score to a threshold value;
in response to determining that the first similarity score is greater than the threshold value, determine that the first user is verified as authorized to access the secure server;
in response to determining that the first similarity score is not greater than the threshold value, determine that the first user is not verified as authorized to access the secure server;
determine a second similarity score by comparing the second image to an image of an authorized administrator of the secure server;
compare the second similarity score to the threshold value;
in response to determining that the second similarity score is greater than the threshold value, determine that the second user is verified as authorized to access the secure server; and
in response to determining that the second similarity score is not greater than the threshold value, determine that the second user is not verified as authorized to access the secure server;
in response to determining that the first user and the second user are verified as authorized to access the secure server, generate a first response to the challenge-response message, wherein the first response indicates that the first user and the second user are verified as authorized to access the secure server; and
in response to determining that the first user and/or the second user are not verified as authorized to access the secure server, generate a second response to the challenge-response message, wherein the second response indicates that the first user and/or the second user are not verified as authorized to access the secure server;
receive a third response to the challenge-response message from the first user device;
if the received third response indicates the first user and the second user are verified, allow the first user to access the secure server; and if the received third response indicates the first user and/or the second user are not verified, prevent the first user from accessing the secure server.

2. The system of claim 1, wherein:
the request to access the secure server comprises a request to access a first secure application hosted on the secure server; and
the processor is further configured to:
  determine an initial administrator in a list of authorized administrators of the first secure application; and
  determine the second user is the initial administrator in the list of authorized administrators.

3. The system of claim 2, wherein the processor is further configured to:
determine that the second user device is not responsive to the push notification within a threshold period of time;
following determining that the second user device is not responsive to the push notification within the threshold period of time:
  determine a next administrator in the list of authorized administrators of the first secure application; and
  determine the second user is the initial administrator in the list of authorized administrators.

4. The system of claim 1, wherein the processor is further configured to:
determine that the first user device is not responsive to the challenge-response message within a threshold period of time; and
following determining that the first user device is not responsive to the challenge-response message within the threshold period of time, prevent the first user from accessing the secure server.

5. The system of claim 1, wherein the processor is further configured to, prior to allowing access to the secure server if the received third response indicates the first user is verified:
confirm that a first identity of the first user determined from the first image corresponds to a user identity associated with the received request to access the secure server; and
confirm that a second identity of the second user determined from the second image corresponds to a user identity associated with the second device to which the push notification was provided.

6. The system of claim 1, wherein the push notification includes instructions for the second user to provide an input to confirm or deny whether the first user is authorized to access the secure server.

7. The system of claim 1, wherein:
the received authorization request includes security credentials for the first user; and
the processor is further configured to, prior to providing the challenge-response message to the first user device, determine that the security credentials correspond to predetermined credentials for the first user.

8. A method comprising:
receiving an authentication request corresponding to a request to provide a first user access to a secure server;
in response to receiving the authentication request:
  providing a challenge-response message to a first user device operated by the first user, wherein the challenge-response message indicates authentication of the first user of the first user device is needed, directs the first user device to capture a first image of a face of the first user, and indicates a number of confirming users required to achieve a multi-person authentication; and
  providing a push notification to a second user device operated by a second user, wherein the push notification indicates confirmation of the authentication of the first user of the first user device is needed, directs the second user device to capture a second image of a face of the second user, and instructs the second user device to provide the second image or an authentication result of authenticating the second image to the first user device, wherein the first user device is configured to:
    perform a facial recognition process on the first image and the second image to:
      determine a first similarity score by comparing the first image to an image of an authorized user of the secure server;
      compare the first similarity score to a threshold value;
      in response to determining that the first similarity score is greater than the threshold value, determine that the first user is verified as authorized to access the secure server;
      in response to determining that the first similarity score is not greater than the threshold value, determine that the first user is not verified as authorized to access the secure server;
      determine a second similarity score by comparing the second image to an image of an authorized administrator of the secure server;
      compare the second similarity score to the threshold value;
      in response to determining that the second similarity score is greater than the threshold value, determine that the second user is verified as authorized to access the secure server; and
      in response to determining that the second similarity score is not greater than the threshold value, determine that the second user is not verified as authorized to access the secure server;
    in response to determining that the first user and the second user are verified as authorized to access the secure server, generate a first response to the challenge-response message, wherein the first response indicates that the first user and the second user are verified as authorized to access the secure server; and
    in response to determining that the first user and/or the second user are not verified as authorized to access the secure server, generate a second response to the challenge-response message, wherein the second response indicates that the first user and/or the second user are not verified as authorized to access the secure server;
  receiving a third response to the challenge-response message from the first user device;
  if the received third response indicates the first user and the second user are verified, allowing the first user to access the secure server; and
  if the received third response indicates the first user and the second user are not verified, preventing the first user from accessing the secure server.

9. The method of claim 8, wherein:
the request to access the secure server comprises a request to access a first secure application hosted on the secure server; and
the method further comprises:
determining an initial administrator in a list of authorized administrators of the first secure application; and
determining the second user is the initial administrator in the list of authorized administrators.

10. The method of claim 9, further comprising:
determining that the second user device is not responsive to the push notification within a threshold period of time;
following determining that the second user device is not responsive to the push notification within the threshold period of time:
determining a next administrator in the list of authorized administrators of the first secure application; and
determining the second user is the initial administrator in the list of authorized administrators.

11. The method of claim 8, further comprising:
determining that the first user device is not responsive to the challenge-response message within a threshold period of time; and
following determining that the first user device is not responsive to the challenge-response message within the threshold period of time, preventing the first user from accessing the secure server.

12. The method of claim 8, further comprising, prior to allowing access to the secure server if the received third response indicates the first user is verified:
confirming that a first identity of the first user determined from the first image corresponds to a user identity associated with the received request to access the secure server; and
confirming that a second identity of the second user determined from the second image corresponds to a user identity associated with the second device to which the push notification was provided.

13. The method of claim 8, wherein the push notification includes instructions for the second user to provide an input to confirm or deny whether the first user is authorized to access the secure server.

14. The method of claim 8, wherein:
the received authorization request includes security credentials for the first user; and
the method further comprises, prior to providing the challenge-response message to the first user device, determining that the security credentials correspond to predetermined credentials for the first user.

15. A device comprising:
a network interface configured to communicate with a secure server, a first user device associated with a first user, and a second user device associated with a second user; and
a processor configured to:
receive an authentication request corresponding to a request to provide the first user access to the secure server;
in response to receiving the authentication request:
provide a challenge-response message to the first user device, wherein the challenge-response message indicates authentication of the first user of the first user device is needed, directs the first user device to capture a first image of a face of the first user, and indicates a number of confirming users required to achieve a multi-person authentication; and
provide a push notification to the second user device, wherein the push notification indicates confirmation of the authentication of the first user of the first user device is needed, directs the second user device to capture a second image of a face of the second user, and instructs the second user device to provide the second image or an authentication result of authenticating the second image to the first user device, wherein the first user device is configured to:
perform a facial recognition process on the first image and the second image to:
determine a first similarity score by comparing the first image to an image of an authorized user of the secure server;
compare the first similarity score to a threshold value;
in response to determining that the first similarity score is greater than the threshold value, determine that the first user is verified as authorized to access the secure server;
in response to determining that the first similarity score is not greater than the threshold value, determine that the first user is not verified as authorized to access the secure server;
determine a second similarity score by comparing the second image to an image of an authorized administrator of the secure server;
compare the second similarity score to the threshold value;
in response to determining that the second similarity score is greater than the threshold value, determine that the second user is verified as authorized to access the secure server; and
in response to determining that the second similarity score is not greater than the threshold value, determine that the second user is not verified as authorized to access the secure server;
in response to determining that the first user and the second user are verified as authorized to access the secure server, generate a first response to the challenge-response message, wherein the first response indicates that the first user and the second user are verified as authorized to access the secure server; and
in response to determining that the first user and/or the second user are not verified as authorized to access the secure server, generate a second response to the challenge-response message, wherein the second response indicates that the first user and/or the second user are not verified as authorized to access the secure server;
receive a third response to the challenge-response message from the first user device;
if the received third response indicates the first user and the second user are verified, allow the first user to access the secure server; and if the received third response indicates the first user and the second user are not verified, prevent the first user from accessing the secure server.

16. The device of claim 15, wherein:

the request to access the secure server comprises a request to access a first secure application hosted on the secure server; and the processor is further configured to:

determine an initial administrator in a list of authorized administrators of the first secure application; and determine the second user is the initial administrator in the list of authorized administrators.

17. The device of claim 16, wherein the processor is further configured to:

determine that the second user device is not responsive to the push notification within a threshold period of time;

following determining that the second user device is not responsive to the push notification within the threshold period of time:

determine a next administrator in the list of authorized administrators of the first secure application; and determine the second user is the initial administrator in the list of authorized administrators.

18. The device of claim 15, wherein the processor is further configured to:

determine that the first user device is not responsive to the challenge-response message within a threshold period of time; and following determining that the first user device is not responsive to the challenge-response message within the threshold period of time, prevent the first user from accessing the secure server.

19. The device of claim 15, wherein the processor is further configured to, prior to allowing access to the secure server if the received third response indicates the first user is verified:

confirm that a first identity of the first user determined from the first image corresponds to a user identity associated with the received request to access the secure server; and confirm that a second identity of the second user determined from the second image corresponds to a user identity associated with the second device to which the push notification was provided.

20. The device of claim 15, wherein the push notification includes instructions for the second user to provide an input to confirm or deny whether the first user is authorized to access the secure server.

* * * * *